Patented July 5, 1932

1,866,417

UNITED STATES PATENT OFFICE

ANTON MACKERT, OF FRANKFORT-ON-THE-MAIN, GERMANY

PURIFICATION OF AQUEOUS LIQUIDS AND PARTICULARLY OF WASTE WATER FROM FACTORIES

No Drawing. Application filed February 9, 1929, Serial No. 338,880, and in Germany February 9, 1928.

This invention relates to the purification of aqueous liquids and particularly of waste water from factories and to the recovery of the constituents contained in the waste water, by the employment of adsorption media such as for example, active carbon; the spent adsorption media being simultaneously reactivated.

A process has already been described in which the phenolic waste water derived from coking plants is brought into contact with active carbon and the adsorbed constituents are thereupon removed from the carbon and recovered by driving them out with steam, which is preferably highly superheated.

There are several disadvantages attending this process, chief among which is the following:

Inasmuch as they are soluble in water (for example phenol) the constituents obtained in this manner are recovered in aqueous solution and generally in such a diluted state that the removal thereof or further working up entails heavy expense. This disadvantage can only be partly obviated by the employment of higher evaporating temperatures, since apart from the fact that constituents to be removed are adsorbed, the carbon also takes up considerable amounts of water which must first be removed by subjecting same to the action of very highly superheated steam, this operation entailing a great consumption of heat energy before the desired higher temperature can be attained at which the adsorbed constituents are driven off so rapidly that they can be obtained in a suitably concentrated state.

A further grave disadvantage of this process resides in the fact that the adsorptive power of the carbon very rapidly decreases, since it is impossible to drive out all the constituents present merely by the operation of steaming out, and moreover, secondary decompositions of the adsorbed constituents take place especially at high temperatures in contact with the adsorption medium, so that the adsorption media frequently become completely spoilt after a few periods of use.

Moreover, when employing for example, granular active carbon, the employment of high temperatures also causes a rapid mechanical distintegration of the carbon.

It has now been ascertained that the aforesaid drawbacks can be obviated in a simple manner by treating the charged adsorption media with solvents which are capable of dissolving out the adsorbed constituents from the adsorption media and from which the adsorbed constituents can be easily removed again by a simple treatment, for example with the steam.

The present invention is based on the observation that the adsorption equilibrium which is set up between the adsorption media and aqueous solutions, is completely different from the equilibrium which is set up between the adsorption media and non-aqueous solvents, particularly when dealing with solutions of organic substances.

Thus for example, certain types of active carbon in contact with an 0.5% aqueous solution of phenol are capable of adsorbing of about 25 to 30% of their weight of phenol, whilst the same, in contact with a solution of phenol in benzol, can only be charged to an equal extent using a 12% solution of phenol in benzol.

It has been ascertained that the employment of such solvents as are insoluble or only sparingly soluble in water or of solvent mixtures one or more of the components of which possess this property, is of particular advantage for the removal of the adsorbed substances. Solvents of this type are for example, benzol and carbon disulphide or a mixture of benzol and alcohol, benzol and acetone and the like.

It has been ascertained quite unexpectedly that the charged adsorption medium, such as for example, active carbon can moreover, whilst thoroughly moist, be rapidly and immediately freed from the adsorbed constituents by means of the aforesaid solvents and that in such case the simultaneous presence of water scarcely exerts any detrimental influence at all upon the extracting power of these solvents. On the contrary, these solvents may be expelled again from the adsorption media in the simplest manner, for example by steaming out or by treatment with boiling water.

The process is advantageously carried out by leading the waste water to be purified upwardly through the adsorption medium whilst the treatment with the solvent and the subsequent removal of this solvent takes place downwardly, i. e. in the opposite direction; moreover if desired a plurality of containers for the adsorption media may be arranged in series. Thus in this method of operation which is carried out on the counter current principle, a high average degree of charging of the adsorption media employed is effected on the one hand and a solution containing in the solvent the maximum amount of the substances to be removed is obtained during the extraction on the other hand. After separating the dissolved substances from the solvent, for example, by distillation, the solvent can be re-employed.

The main advantages of the hereindescribed process are the following:—

The water taken up during the charging of the adsorption media has no disturbing effect on the reactivation process, and relatively little energy is required in order to drive out the water again.

The whole reactivation of the adsorption medium is effected at relatively low temperatures. Decomposition of the adsorbed constituents by high temperatures and choking up and other damage to the adsorption media caused thereby are completely avoided. The adsorption media are not subjected to any too rapid and too great changes of temperature and are consequently carefully treated.

When employing solvents which are insoluble or sparingly soluble in water, adsorbed constituents are practically quantitatively transferred to the said solvents can be obtained therefrom directly in an anhydrous state.

The herein described process is applicable in general, to the purification and utilization of aqueous liquids or of substances contained therein, such as for example, waste water derived from coking installations, cellulose factories and the like. The purifying process may be carried out in such a way that the purified water can again be employed for industrial purposes, for example, as injecting water for boilers.

Active carbon may be generally used as adsorption medium in which case one or other of the various types of active carbon is preferable according to the liquid to be treated. Thus for example, gas- or steam- activated carbon has proved most effective in the treatment of phenolic waste water. In other respects the type of the adsorption medium to be employed is naturally dependent on the nature of the liquids to be treated. Similarly the nature of the solvents or solvent mixtures serving for the extraction, is dependent upon the substances which have been adsorbed and which are to be removed.

The adsorption media can be employed either in the form of pieces or in a powdered state. When working with media in the granular form, especially in a coarsely granular form, the same may be employed in layers of great depth, thus for example, the employment of layers exceeding one metre in depth and moreover the arrangement in series of a plurality of adsorbers has been found very advantageous. Likewise, when employing powdered adsorption media, several filter elements are advantageously connected in series.

Example

Waste water from coking installations, containing 0.5% of phenol as the main constituent was, after removal of the suspended particles contained therein passed upwardly through a layer of granular active carbon 1.5 metres deep. The carbon adsorbed about 25% of its weight of phenol. The moist carbon was thereupon irrigated from above with hot benzol; the benzol flowing out at the bottom contained about 11% of phenol. The benzol was continuously distilled off in a rectifying column and was used repeatedly for further extraction operations. When the phenolic content of the benzol flowing out at the bottom of the apparatus had fallen to about 3%, steam at 100° C. was likewise passed downwardly through the active carbon and the benzol absorbed by the carbon was driven out, the benzol trickling down taking with it further amounts of the phenol still contained in the carbon. After the benzol, had been driven out, the upper portion of the carbon was practically free from phenol and the lower portion contained only about 3% of phenol.

I claim:—

1. A process for purifying aqueous liquids, such as industrial waste waters, which comprises contacting the aqueous liquid with a highly porous solid adsorbent of the type of active carbon, removing adsorbed substances from the adsorbent by treatment with a liquid solvent and driving out the liquid solvent remaining in the adsorbent by scavenging with a gaseous medium.

2. A process for purifying aqueous liquids, such as industrial waste waters, which comprises contacting the aqueous liquid with a highly porous solid adsorbent of the type of active carbon, removing adsorbed substances from the adsorbent by treatment with a liquid solvent and driving out the liquid solvent remaining in the adsorbent by scavenging with steam.

3. A process for purifying aqueous liquids, such as industrial waste waters, which comprises contacting the aqueous liquid with a highly porous solid adsorbent of the type of active carbon, removing adsorbed substances from the adsorbent by treatment with a mixture of liquid solvents and driving out the liquid solvent remaining in the adsorbent by scavenging with a gaseous medium.

4. A process for purifying aqueous liquids, such as industrial waste waters, which comprises contacting the aqueous liquid with a highly porous solid adsorbent of the type of active carbon, arranged in a layer at least one meter in depth, removing adsorbed substances from the adsorbent by treatment with a liquid solvent and driving out the liquid solvent remaining in the adsorbent by scavenging with a gaseous medium.

5. A process for purifying aqueous liquids, such as industrial waste waters, which comprises contacting the aqueous liquid with a highly porous solid adsorbent of the type of active carbon, arranged in layers of at least one meter in depth and in a plurality of successive containers, removing adsorbed substances from the adsorbent by treatment with a liquid solvent and driving out the liquid solvent remaining in the adsorbent by scavenging with a gaseous medium.

6. A process for purifying aqueous liquids, such as industrial waste waters, which comprises passing the aqueous liquid upwardly in contact with a highly porous solid adsorbent of the type of active carbon, removing adsorbed substance from the adsorbent by passing a liquid solvent downwardly in contact with the adsorbent and driving out the liquid solvent remaining in the adsorbent by scavenging with a gaseous medium.

In testimony whereof I affix my signature.

ANTON MACKERT.